United States Patent [19]

Harris et al.

[11] 4,338,513

[45] Jul. 6, 1982

[54] BISTABLE MAGNETIC WIRE BADGE READER

[75] Inventors: Richard G. Harris, Franklin; Robert J. Dalessio; Neil W. Harman, both of Marlboro, all of Mass.

[73] Assignee: Honeywell Information Systems Inc., Waltham, Mass.

[21] Appl. No.: 175,461

[22] Filed: Aug. 5, 1980

[51] Int. Cl.³ .................... G06K 7/08; G06K 19/06
[52] U.S. Cl. .................................. 235/449
[58] Field of Search ............... 365/133, 62, 86; 360/2; 235/493, 449, 437; 340/149 A

[56]   References Cited

U.S. PATENT DOCUMENTS

| | | | |
|---|---|---|---|
| 3,820,090 | 6/1974 | Wiegand | 365/62 |
| 3,961,160 | 6/1976 | Gorgens | 235/437 |
| 4,187,981 | 2/1980 | Sinko et al. | 235/493 |

Primary Examiner—Thomas A. Robinson
Attorney, Agent, or Firm—Nicholas Prasinos

[57] ABSTRACT

A badge reading system is provided which includes a badge having embedded therein bistable magnetic wires arranged in BCD encoded logic patterns, and a badge reader for reading the bistable magnetic wire patterns to form an information stream. As the badge is inserted within the badge reader housing, the movement of the badge is sensed at initial, intermediate and full insertion points along the insertion path. A logic control system of the badge reader operates in concert with the sensors and a bistable magnetic wire detector to protect against data errors which may occur because of incorrect badge orientations and insertions, and counterfeit badges.

4 Claims, 17 Drawing Figures

| DECODER 86 ROW 0 OUTPUT | DETECTOR UNIT 75 OUTPUTS | | | DECODER 86 ROW 1 — ROW 9 OUTPUTS | DATA CABLE 88 ROW 0 OUTPUT LINE |
|---|---|---|---|---|---|
| | D1 | D2 | D3 | | |
| 0 | 0 | X | 0 | X | 1 |
| 0 | 0 | X | 1 | X | 1 |
| 0 | 1 | X | 0 | X | 1 |
| 0 | 1 | X | 1 | X | 1 |
| 1 | 0 | X | 0 | X | 0 |
| 1 | 0 | X | 1 | X | 1 |
| 1 | 1 | X | 0 | X | 1 |
| 1 | 1 | X | 1 | X | 1 |

| DECODER 86 ROW 1 OUTPUT | DETECTOR UNIT 75 OUTPUTS | | | DECODER 86 ROW 0, ROW 2-9 OUTPUTS | DATA CABLE 88 ROW 1 OUTPUT LINE |
|---|---|---|---|---|---|
| | D1 | D2 | D3 | | |
| 0 | X | 0 | X | X | 1 |
| 0 | X | 1 | X | X | 1 |
| 1 | X | 0 | X | X | 0 |
| 1 | X | 1 | X | X | 1 |

Fig. 11.

| DECODER 86 ROW 2 OUTPUT | DETECTOR UNIT 75 OUTPUTS | | | DECODER 86 ROW 0, 1, 3-9 OUTPUTS | DATA CABLE 88 ROW 2 OUTPUT LINE |
|---|---|---|---|---|---|
| | D1 | D2 | D3 | | |
| 0 | X | X | 0 | X | 1 |
| 0 | X | X | 1 | X | 1 |
| 1 | X | X | 0 | X | 0 |
| 1 | X | X | 1 | X | 1 |

Fig. 12.

BISTABLE MAGNETIC WIRE BADGE READER

BACKGROUND OF THE INVENTION

1. Field of the Invention

The invention relates to information validation systems, and more particularly to access control systems, item-dispensing systems or factory management systems responsive to information recorded on an employee badge, a credit card or other recording medium.

2. Prior Art

Automated control systems responsive to data encoded on recording mediums such as credit cards or employee badges are known in the art. The data has been encoded as raised areas on a card for use with mechanical reading systems employing static contacts, and as optically reflective areas or lines superimposed on a card for use with light source and sensor configurations. Data further has been encoded as punched holes in a card for use with light source and sensor configurations as set forth in U.S. Pat. No. 3,961,160 assigned to the assignee of the present invention. Still further, data has been recorded as magnetically encoded strips and as encoded information written on a card with magnetic ink for use with magnetic reading systems.

The mechanical systems have proved to be unreliable in an environment requiring repeated use on a continual basis because of contact element misalignment and wear.

The optical, magnetic ink and magnetic strip systems have typically employed badge reader swipe means wherein a badge is passed between guide members of an open slot. Such systems have proved to be unreliable because of the multiplicity of hand movements and badge orientations which may occur as a badge user passes a read station.

A further problem area is that the optical reflectors, punched holes, magnetic ink and magnetic strip methods of encoding information on a card or badge may be easily duplicated or altered by unauthorized users.

The present invention is directed to a system of a badge uniquely encoded through the use of bistable magnetic wires, and a badge reader adapted to accept and read such a card, which collectively overcome the problems of the prior systems.

SUMMARY OF THE INVENTION

The present invention provides a system for identifying a badge user to control access to restricted areas or objects such as cash, or to provide employee resource information in the assignment of tasks as part of a factory management data system.

More particularly, a badge or other record means is encoded by means of bistable magnetic wires embedded therein and arranged in a pattern representative of a binary coded decimal (BCD) encoding.

A badge reader is provided into which the encoded badge may be inserted. During the insertion of the badge, the bistable magnetic wires are sensed by the reader. The encoded information thereby is read, and subsequently decoded for further processing.

In one aspect of the invention, the orientation of the badge upon insertion is sensed to protect against incorrect data signals which may be generated in the event an incorrectly inserted badge is read.

In another aspect of the invention, the progress of the badge insertion is sensed to protect against incorrect data signals which may be generated in the event a badge is partially inserted and then prematurely retrieved.

In still another aspect of the invention a badge restraining means is provided to protect against incorrect data signals being generated because of a premature retrieval of a badge after a full insertion.

In a further aspect of the invention, the number of bistable magnetic wires detected as the badge is inserted into the reader is compared with a predetermined number to protect against counterfeit badges.

DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings, wherein:

FIGS. 7–17 are graphic illustrations of the operation of the logic devices comprising the electronic control unit of FIG. 6.

DESCRIPTION OF THE PREFERRED EMBODIMENTS

FIG. 1

Figure 1:
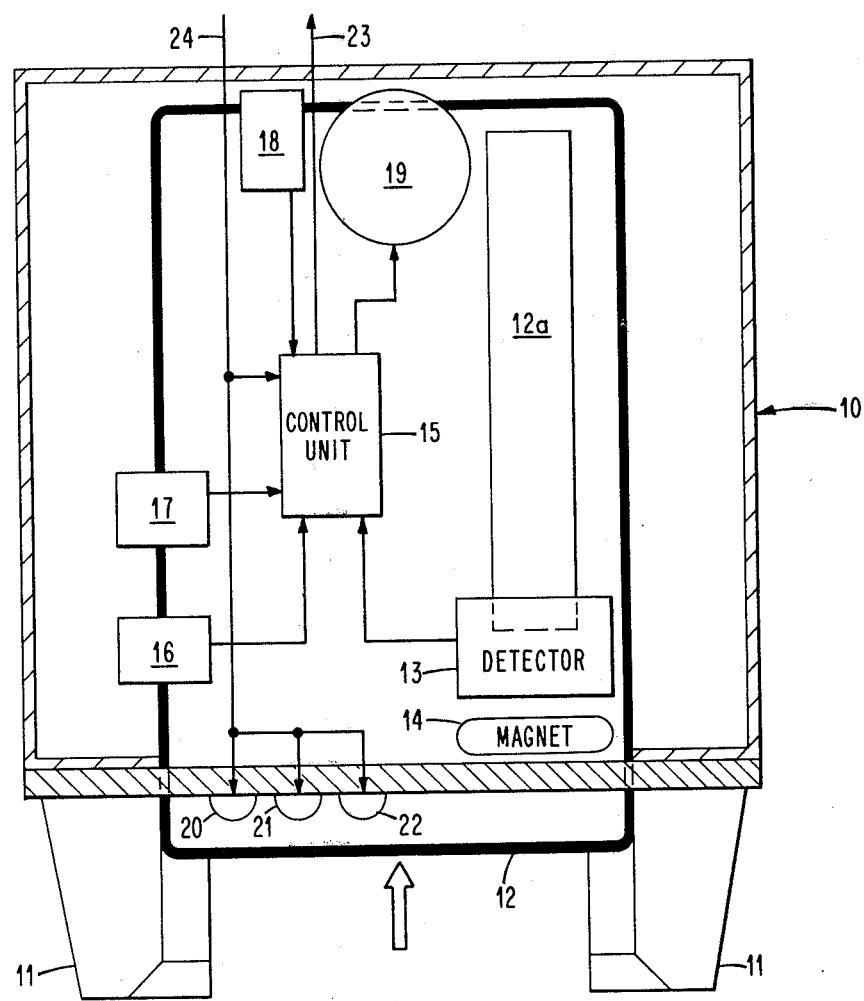
FIG. 1 is a functional block diagram of a badge reader embodying the invention.

FIG. 1 illustrates in an electrical/mechanical block diagram form a badge reading system incorporating the invention.

Referring to FIG. 1, a badge reader 10 having badge guides 11 for guiding the insertion of a badge 12 into the reader 10 is illustrated. The badge 12 includes a strip 12a wherein bistable magnetic wires having the characteristics disclosed and claimed in U.S. Pat. No. 3,820,090 are laminated into the badge. Housed within the badge reader 10 are a bistable magnetic wire detector 13, a permanent magnet 14, an electronic control unit 15, optical switches 16–18 and a restraining solenoid 19.

The magnet 14 and the detector 13 are positioned within the reader 10 so that the strip 12a upon proper insertion of the badge 12 shall first pass in registration with the magnet 14, and then in registration with the detector 13. The magnet 14 and detector 13 comprise a bistable magnetic wire read head manufactured and sold by Sensor Engineering Company of Branford, Conn., and represented to the public by Part No. 30032.

The optical switches 16 and 17 are positioned along the path of insertion of the badge, and are activated by the leading edge of the badge. The detector 13 is separated from the switch 17 along the insertion path by a distance accommodating the detection of at least one bistable magnetic wire by the detector 13 before the optical switch 17 is activated. The optical switch 18 is positioned to indicate the full insertion of the badge 12 into the reader 10. The restraining solenoid 19 is positioned to grip the leading edge of the badge, thereby restraining the badge upon full insertion.

The lamps 20, 21 and 22 are light emitting diode (LED) lamps which are energized by a local controller, to be later described, to indicate the operating status of the reader 10.

In operation, the badge 12 is placed between the badge guides 11 of the reader 10, and urged forward into the badge reader. As the leading edge of the badge 12 proceeds into the badge reader, the optical switch 16 first is activated to indicate the presence of the badge card. As the badge continues forward between optical switch 16 and optical switch 17, the detector 13 detects the presence of the bistable magnetic wires embedded in the badge within the strip area 12a. As before stated, the detector 13 and switch 17 are separated by a distance accommodating the detection of at least one bistable wire before the switch 17 is activated. As the badge 12 continues into the badge reader 10, the detector 13 continues to sense the badge 12 to detect bistable magnetic wires until the optical switch 18 is activated.

Upon the activation of optical switch 18, the restraining solenoid 19 is energized to restrain the badge 12 within the reader 10. During the time period that the badge 12 is being restrained, the control unit 15 processes signals which were received from the detector 13 during the insertion of the badge 12. The control unit 15 supplies row and column data as well as a no-badge signal to a control bus 23 leading to a local controller which may be of the type illustrated in FIG. 4 of U.S. Pat. No. 3,961,160, assigned to the assignee of the present invention. Upon detection of valid data in the information stream received from the control unit 15, the local controller issues a signal to the control unit 15 by way of a control bus 24 to de-energize the restraining solenoid 19. In this event, LED 20 is illuminated to alert the customer that the badge 12 may be removed from the reader 10. In the event that the data received from the control unit 15 is not accepted by the local controller, the restraining solenoid 19 is not de-energized and the LED 21 is energized. The customer thereby is informed that an error condition exists. The LED 22 is illuminated by the local controller when the controller can receive new information.

FIG. 2

Figure 2:
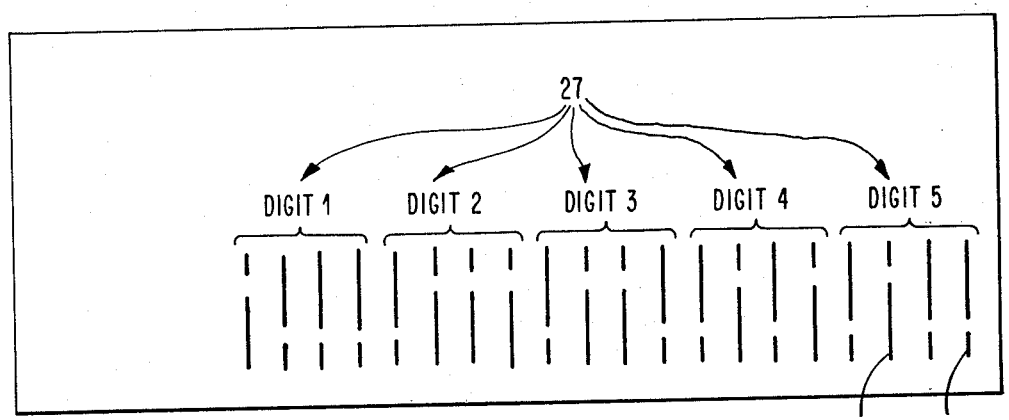
FIG. 2 is a graphical illustration of a bistable magnetic wire pattern representative of a binary coded decimal encoding.

FIG. 2 illustrates graphically a binary encoded pattern of bistable magnetic wires embedded in the strip 12a of badge 12.

A binary encoded word is formed by a pattern of long and short bistable magnetic wires positioned within the badge perpendicular to the centerline of the detector 13 path. The horizontal centerline of the bistable magnetic wire pattern is in alignment with the centerline of the detector path.

Referring to FIG. 2, a logic pattern comprised of a long and a short bistable magnetic wire as indicated by reference number 25 is sensed by the detector 13 to be a logic zero. A logic pattern as indicated by reference number 26 is sensed to be a logic one. The group of logic patterns generally indicated by reference number 27 is representative of a five digit, four wire per digit, binary coded decimal (BCD) encoding. When four contiguous logic patterns are considered as an entity, the four patterns may represent a single BCD digit. The twenty logic patterns 27 of FIG. 2, therefore, represent the BCD digits 87654.

FIG. 3

Figure 3:
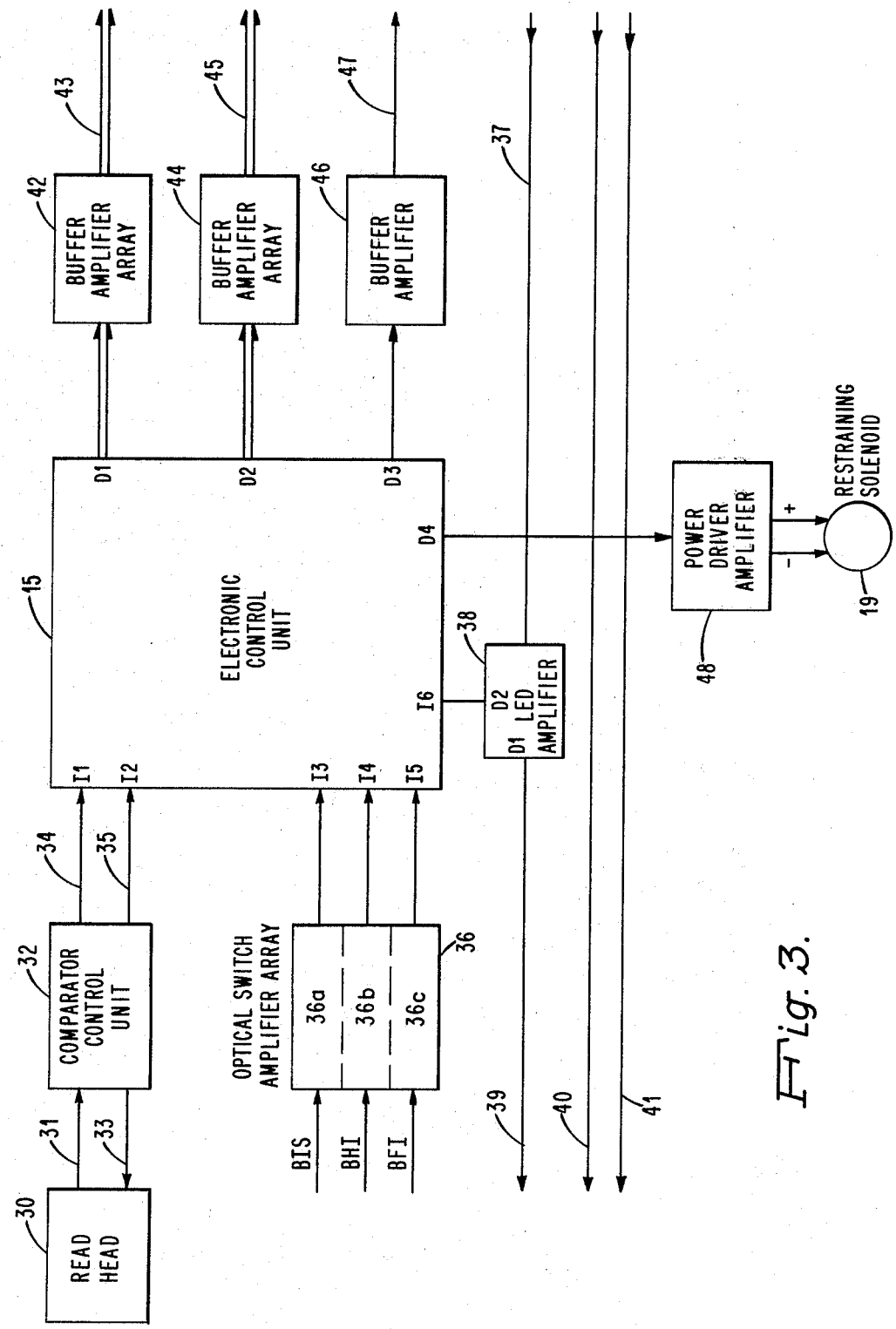
FIG. 3 is a more detailed functional block diagram of the badge reader of FIG. 1.

FIG. 3 illustrates in a more detailed electrical functional block diagram form the badge reader 10 of FIG. 1.

Referring to FIG. 3, a read head 30 comprising magnet 14 and detector 13 of FIG. 1 senses strip 12a of the badge 12 to detect the presence of bistable magnetic wires. The detector 13 issues either a positive or negative pulse upon detecting a bistable wire. If a pattern of bistable wires is sensed, a train of positive and negative pulses is supplied by way of a control line 31 to the inputs of two input comparators comprising a comparator control unit 32.

In the preferred embodiment disclosed herein, the comparator control unit supplies a 2.5 volt reference signal to a control line 33 leading to the read head 30. The output of the comparator control unit is provided in two parts. The first output is comprised of logic one pulses appearing on a control line 34 which is connected to the I1 input of electronic control unit 15 of FIG. 1. Each logic one pulse on control line 34 indicates the occurrence of a logic zero bistable magnetic wire pattern in strip 12a of badge 12. The second output is comprised of logic one pulses appearing on a control line 35 leading to the I2 input of the control unit. Each logic one pulse on control line 35 indicates the occurrence of a logic one bistable magnetic wire pattern in strip 12a.

An optical switch amplifier array 36 receives signals from optical switches 16-18 of FIG. 1 as the badge 12 is inserted into the badge reader 10. More particularly, as the badge 12 is placed in the receiving slot between badge guides 11, the optical switch 16 issues a badge in slot (BIS) logic one pulse by way of an amplifier 36a to the I3 input of the control unit 15. When the badge is inserted further into the reader 10, optical switch 17 issues a badge halfway in (BHI) logic one pulse by way of an amplifier 36b to the I4 input of the control unit. Upon full insertion of the badge, optical switch 18 issues a badge fully in (BFI) logic one pulse by way of an amplifier 36c to the I5 input of the control unit 15.

The local controller provides three logic signals for energizing the LED lamps 20-22 to indicate three different operating states. A first logic one pulse is applied by the local controller to a control line 37 leading to an LED amplifier 38. In response thereto, the amplifier 38 supplies a logic one pulse to a control line 39 leading to LED 20 to indicate that a customer may remove his badge. The amplifier 38 also supplies a logic one pulse to the I6 input of the control unit 15 to deactivate the restraining solenoid 19 as shall be more particularly described. The reader 10 receives a second logic one pulse from the local controller by way of a control line 40 leading to LED 21, which indicates to a customer that an error has occurred in the reading of the badge 12. A third logic one pulse is supplied by the local controller to a control line 41 leading to LED 22 to indicate to a customer that the badge reader 10 is ready for use.

The D1 output of control unit 15 is a 10-bit wide output which is applied by way of a buffer amplifier array 42 to an output data cable 43. The D2 output of the control unit is a 10-bit wide output which is applied by way of a buffer amplifier array 44 to an output data cable 45. The D1 and D2 outputs of the control unit provide column and row data, respectively, to the local controller.

The D3 output of the control unit 15 is a single bit output which is applied by way of a buffer amplifier 46 to a control line 47 to indicate that there is no badge present in the card reader. The D4 output of the control unit is a single bit output which is applied to a power driver amplifier 48 controlling the restraining solenoid 19. In the preferred embodiment disclosed herein, the D4 output transitions to a logic zero level when a counter internal to the control unit 15 indicates that a total of twenty bistable magnetic wire binary codes have been detected by the read head 30. The power driver amplifier 48 is activated thereby to cause the solenoid 19 to restrain a badge within the reader 10. When a logic zero to logic one transition is applied to the I6 input of the control unit 15, the D4 output of the control unit transitions to a logic one level to deactivate the power driver amplifier 48. In the preferred embodiment, the power driver amplifier 48 is a 117 volt A.C., 60 Hz power amplifier.

Figure 4:
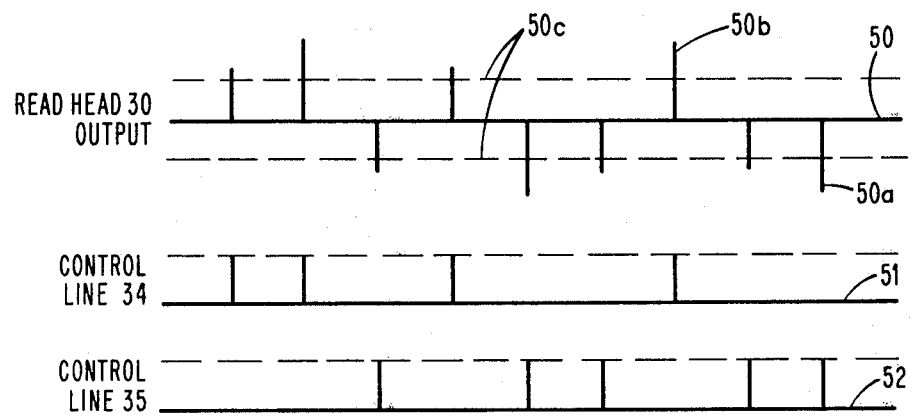
FIGS. 4 and 5 are graphic illustrations of the operation of the read head and the power driver amplifier, respectively, of FIG. 3.
Figure 5:
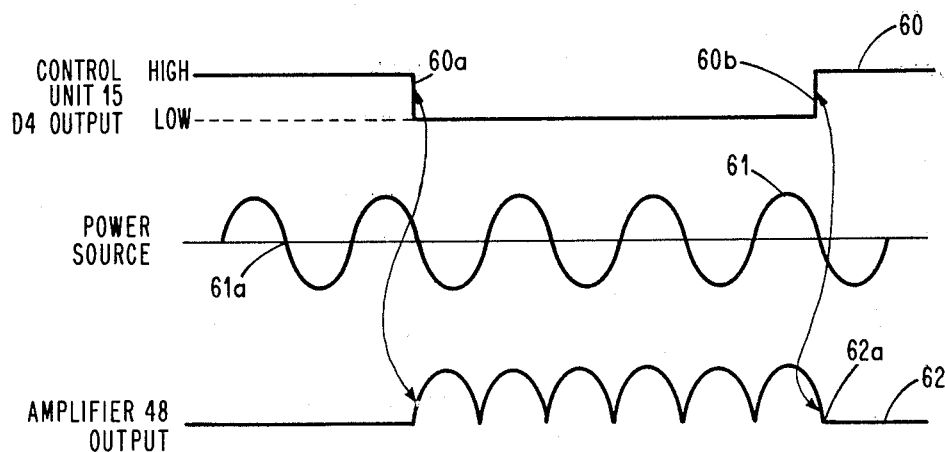

FIGS. 4 and 5

FIGS. 4-5 illustrate in graphic form specific aspects of the badge reader 10 of FIG. 3.

Referring to FIG. 4, a waveform 50 illustrates the output of read head 30 as applied to control line 31. The pulses 50a of waveform 50 indicate logic one bistable magnetic wire patterns, and the pulses 50b indicate the occurrence of logic zero patterns. The dotted lines 50c indicated 2.50 volt±75 millivolt voltage levels.

A waveform 51 illustrates an electrical signal appearing on control line 34, and a waveform 52 illustrates an electrical signal appearing on control line 35 of FIG. 3.

As before stated, individual bistable magnetic wires having the characteristics described and claimed in U.S. Pat. No. 3,820,090 may be arranged in logic one and logic zero patterns which upon detection cause the read head 30 to generate either a positive pulse or a negative pulse. The output of the read head as illustrated by waveform 50 is applied to each of two comparators comprising the comparator control unit 32 of FIG. 3. A first comparator is arranged to detect logic one pulses having a magnitude less than or equal to 2.50 volts minus 75 millivolts. Each time a logic one pulse exceeding the detectable limits is sensed by the first comparator, the comparator issues to control line 34 a logic one pulse having a magnitude of approximately 5.0 volts for TTL level compatibility as illustrated by waveform 51. When a logic zero pulse equal to 2.50 volts plus 75.0 millivolts is detected by a second comparator, a logic one pulse having a magnitude of approximately 5.0 volts is issued to control line 35 as illustrated by waveform 52.

Referring to FIG. 5, the operation of the power driver amplifier 48 is illustrated in more detail. A waveform 60 illustrates the D4 output of the electronic control unit 15. A waveform 61 illustrates a 117 volt A.C., 60 Hz power source which is applied to the amplifier 48. A waveform 62 illustrates the output of the amplifier 48 which is applied to the restraining solenoid 19 of FIG. 3.

After the D4 output of the control unit 15 transitions to a logic zero level as illustrated at 60a of waveform 60, the output of the power driver amplifier 48 as illustrated by waveform 62 increases positively upon the first occurrence of a zero crossing in the waveform 61 as indicated at 61a. This is equivalent to a turn-on condition for energizing the restraining solenoid 19. When the D4 output of the control unit 15 transitions to a logic one level as illustrated at 60b of waveform 60, the restraining solenoid 19 is de-energized as illustrated at 62a of waveform 62. The deactivation occurs concurrently with a zero crossing of waveform 61.

FIG. 6

Figure 6:
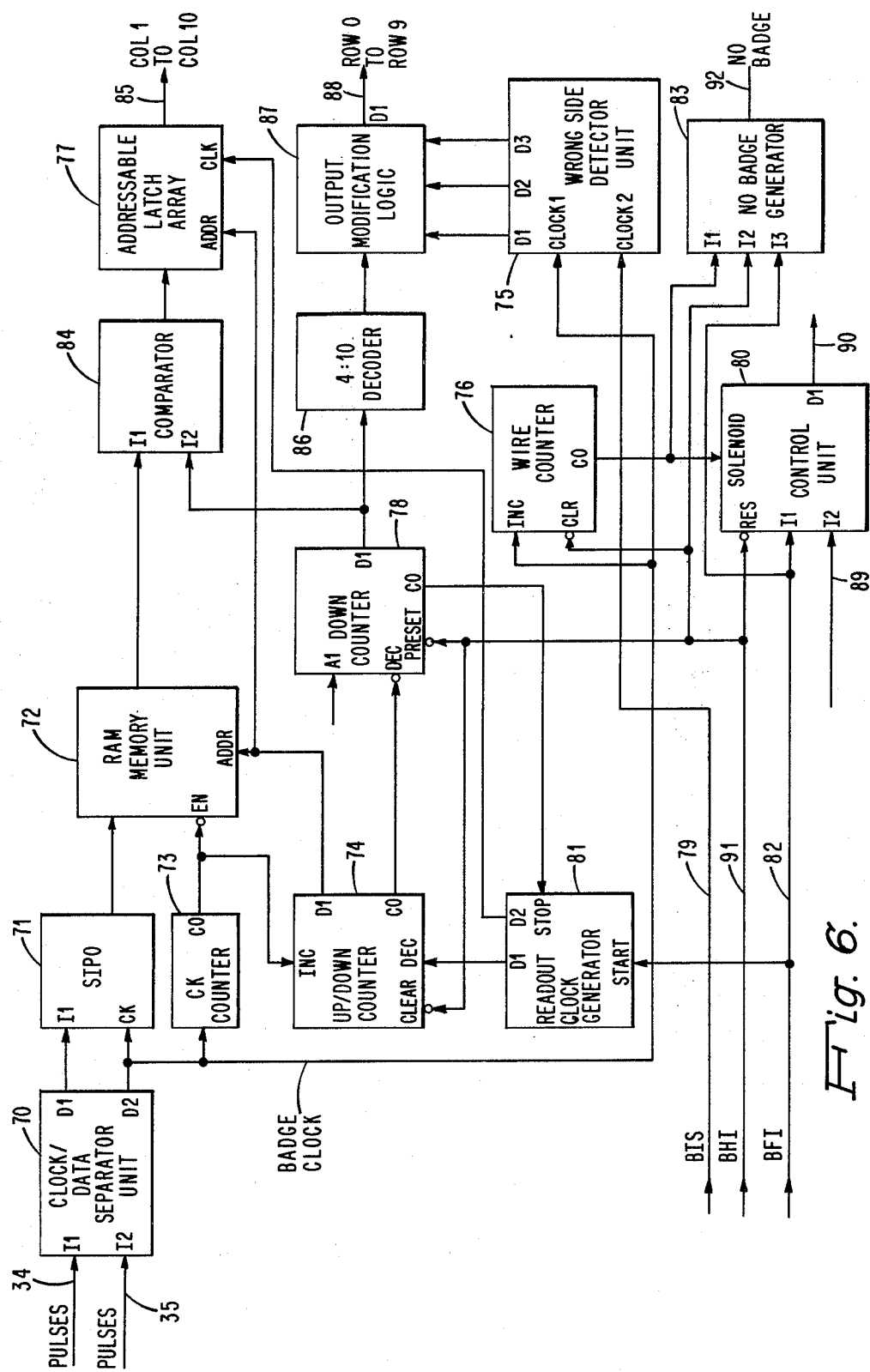
FIG. 6 is a detailed functional block diagram of the electronic control unit of FIG. 3.

FIG. 6 illustrates in a more detailed functional block diagram form the electronic control unit 15 of FIGS. 1 and 3.

In referring to the diagram of FIG. 6, it is to be understood that the occurrence of a small circle at the input of a logic device indicates that the input is enabled by a logic zero. A small circle appearing at an output of a logic device indicates that when the logic conditions for that particular device are satisfied, the output will be a logic zero.

The control lines 34 and 35 leading from the comparator control unit 32 of FIG. 3 are applied to the I1 and I2 inputs, respectively, of a clock/data separator unit 70, the operation of which shall be more particularly described below. A one-bit badge data output of the separator unit 70 is applied to the I1 input of a four-bit serial-in-parallel-out (SIPO) register 71. The clock input to the SIPO register is supplied by the clock output D2 of the separator unit 70, and the four bit output of the register 71 is applied to the input of a 4×16 bit random access memory (RAM) unit 72.

The D2 output of the separator unit 70 also is applied to the clock input of a two-bit counter 73, the carry-out output of which is applied to the write enable (WEN) input of the RAM unit 72 and to the increment input of an up/down four-bit counter 74. The D2 output of the separator 70 further is applied to the clock 1 input of a wrongside detector unit 75, and to the increment input of a five-bit up-counter 76.

The D1 output of the counter 74 is a four-bit output which is applied to the address input of the RAM unit 72 and to the address input of an addressable latch array 77 comprised of ten addressable latches. The carry-out output of the counter 74 is applied to the decrement input of a four-bit down counter 78. The clear input to the counter 74 is connected to the reset input of the counter 78 and to the BIS (badge in slot) control line 79 leading to the reset input of a solenoid control unit 80. The decrement input of the counter 74 is connected to an output D1 of a read-out clock generator 81.

The start input of the generator 81 is connected to a badge-fully-in (BFI) control line 82, which also is connected to the I1 input of the solenoid control unit 80 and to the I3 input of a no-badge generator 83. The stop input to the generator 81 is connected to a carry-out output of the counter 78.

The decrement input to the counter 78 is connected to the carry-out output of counter 74, and the data input A1 to the counter 78 is connected to a logic source for presetting the counter to a decimal value of 10. The D1 output of the counter 78 is a four-bit output which is applied to the I2 input of a comparator 84, the I1 input of which is connected to the four bit output of the RAM unit 72. The output of the comparator 84 is a single bit output which is applied to the inputs of the latch array 77. The clock input to the array 77 is supplied by the D2 output of the generator 81, and the ten bit output of the array 77 is applied to a ten-bit data cable 85.

The four bit D1 output of the counter 78 also is applied through a four to ten bit decoder 86 to an output modification logic unit 87. The logic unit 87 modifies the output of the decoder 86 in accordance with the logic states indicated by the wrongside detector unit 75 at its D1-D3 outputs. The output of the logic unit 87 is applied to a ten-bit data cable 88.

A clear input to the wire counter 76 is supplied by the control line 79, which also is connected to the I2 input of generator 83. The carry-out output of the counter 76 is applied to the I3 input of the solenoid control unit 80, and to the I1 input of the generator 83. The output of generator 83 is applied to a control line 92 leading to the local controller. The solenoid control unit 80 also receives by way of control line 89 the D2 output of the LED amplifier 38 of FIG. 3, and provides a one-bit output by way of a control line 90 to the power driver amplifier 48 of FIG. 3. The clock 2 input to detector 75 is supplied by optical switch 16 of FIG. 1 through amplifier 36c of FIG. 3 by way of a control line 91.

In operation, a customer inserts the badge 12 of FIG. 1 into the card slot of the badge reader 10. As the badge is being inserted, the forward edge of the badge is detected by optical switch 16. In response thereto, control line 79 of FIG. 6 transitions to a logic one level to disable the reset input of counter 78, the clear inputs of counters 74 and 76, and the reset input of solenoid control unit 80. In addition, the output of the no-badge generator 83 transitions to a logic zero level to indicate to the local controller that a badge is present in the badge reader. As the read head 30 of FIG. 3 senses the presence of bistable magnetic wires in the customer badge, the read head issues logic one pulses by way of the comparator control unit 32 to the control lines 34 and 35 of FIG. 3.

The separator unit 70 of FIG. 6 receives the logic one pulses from the comparator control unit 32, and derives therefrom a clock signal comprised of logic one pulses for each occurrence of a logic one pulse on control lines 34 and 35. In addition, the separator unit 70 supplies a data signal which is characterized by a transition to a logic zero level upon detection of each logic one pulse on control line 34, and by a transition to a logic one level for each logic one pulse detected on control line 35. The data signal from the separator unit 70 is a serial data stream which is applied to the I1 data input of the SIPO register 71. When four data bits have been clocked into the SIPO register, the counter 73 issues a logic zero signal from its carry-out output to the write enable input of the RAM unit 72. A four-bit half-byte at the output of register 71 thereupon is written into that address of the RAM unit which is represented by the four bit D1 output of counter 74. Initially, the counter 74 is in a reset condition, and the D1 output of the counter is comprised of four bit positions each at a logic zero level. At the completion of a write operation, the carry-out output of the counter 73 transitions to a logic one level in response to the clock signal at the D2 output of separator unit 70. The counter 74 thereby is incremented to point to a new location of RAM unit 72. As the write operation continues, and the information in register 71 is written into the RAM unit 72, the badge continues to be inserted by the customer into the badge reader.

Upon a first detection of a logic one pulse on control lines 34 and 35 by the separator unit 70, a clock pulse at the D2 output of the separator unit is applied to the increment input of the counter 76 and the clock 1 input of the wrongside detector unit 75. As the customer badge is inserted approximately halfway into the badge reader, a second optical switch 17 of FIG. 1 senses the edge of the card. The switch thereupon causes the control line 91 leading to the clock 2 input of the detector unit 75 to transition to a logic one level. If a clock one input to the detector unit 75 has occurred prior to the time of a clock 2 input, no error indication is provided at the D1-D3 outputs of the detector. If a clock 1 input has not previously occurred, however, the D1-D3 outputs of the detector unit 75 transition to a logic one level in a consecutive time sequence to indicate that an error has occurred. Such an error may occur if the badge is partially inserted and then retrieved before a full insertion. Also, an error shall be indicated if the badge is incorrectly oriented upon insertion.

Upon the customer badge being fully inserted into the badge reader 10, a third optical switch 18 of FIG. 1 causes the control line 82 of FIG. 6 to transition to a logic one level to initialize the solenoid control unit 80. If at this time the carry-out output of counter 76 is at a logic one level to indicate that a predetermined number of bistable magnetic wire logic patterns have been detected, the solenoid control unit 80 is enabled to supply a logic zero level to control line 90. In the preferred embodiment disclosed herein, twenty bistable magnetic wire logic patterns are embedded in the customer badge.

The power driver amplifier 48 of FIG. 3 is energized by the logic zero signal on line 90 to cause the solenoid 19 to restrain the badge within the badge reader. If an incorrect number of bistable magnetic wire logic patterns are detected upon the full insertion of a badge, the carry-out output of the counter 76 shall be at a logic zero level when the control line 82 transitions to a logic one level. In this event, the no-badge generator 83 issues a logic one level to control line 92 to indicate that the customer badge has been withdrawn prior to a transfer of badge information through the control unit 15 of FIGS. 3 and 6. Upon the occurrence of this error condition, the data appearing on data cables 85 and 88 is not accepted by the local controller.

The read-out clock generator 81 provides signals comprised of 100.0 KHz ten-pulse bursts at both the D1 and D2 outputs. The two outputs are separated by a time period of approximately one millisecond. The counter 74 thereupon enters a decrement mode in which the D1 output of the counter sequentially addresses the half-byte storage locations of RAM memory unit 72 in the reverse of the order in which the information of register 71 was written into the memory unit. The control unit 16 of FIG. 6 thereby enters into a data transfer mode.

Upon the occurrence of the trailing edge of the last pulse of a ten-pulse burst provided at the D1 output of generator 81, the carry-out output of counter 74 transitions to a logic one level to decrement the counter 78. While the counter 74 is addressing the half-byte storage locations of RAM unit 72, the output of the counter 78 is compared by means of comparator 84 with the output of RAM unit 72. If the output of the counter 78 and the half-byte value stored in the addressed memory location are equivalent, the output of comparator 84 transitions to a logic zero level.

Each of the four-bit addresses applied by the counter 74 to the RAM unit 72 also are applied to an address input of the addressable latch array 77. The latches comprising the array thereby are sequentially addressed during each ten-pulse burst supplied to the clock input of the array by the clock generator 81, and the output of the comparator 84 is stored in the addressed latches. The addressable latches comprising array 77 thus provide a column indication of the location of a counter 78 output stored in RAM unit 72.

During a data transfer operation, the D1 output of the counter 78 is continually decoded by the decoder 86 to provide a ten-bit output, which in the event of a detected error may be modified by the output modification logic unit 87 in response to signals received from the wrongside detector unit 75. The decoder 86 of the preferred embodiment disclosed herein is of the type manufactured and sold by Texas Instruments Inc. of Dallas, Tex., and identified to the public by model number SN7442A. In operation, the decoder receives a four-bit half-byte from the counter 78, and provides a logic zero at one of ten outputs to indicate the decimal value of the half-byte word.

The D1 output of the logic unit 87 provides a row indication on the data cable 88. The signals appearing on data cables 85 and 88, therefore, collectively indicate a column and row representative of a number stored in the RAM unit 72. This information further may be processed in a follow-on local controller comprising a reading mechanism for determining the authenticity or validity of the information read from a customer badge.

If an error is detected by the wrongside detector unit 75, the high order three bits of the ten-bit word supplied by the decoder 86 are modified in the logic unit 87.

When the local controller accepts the column and row data supplied by way of data cables 85 and 88, respectively, the control line 89 transitions to a logic one level to de-energize the solenoid control unit 80. A customer thereupon may remove the customer badge.

The local controller also supplies a signal to the control cable 24 of FIG. 1 to energize LED 20 and thereby indicate to a customer that the customer badge may be removed. When the customer badge is removed, the control line 79 transitions to a logic zero level to reset the control unit 15 of FIG. 6.

FIGS. 7-17

FIGS. 7-17 illustrate in a more detailed form the operation of specific devices comprising the electronic control unit 15 of FIG. 6.

Figure 7:
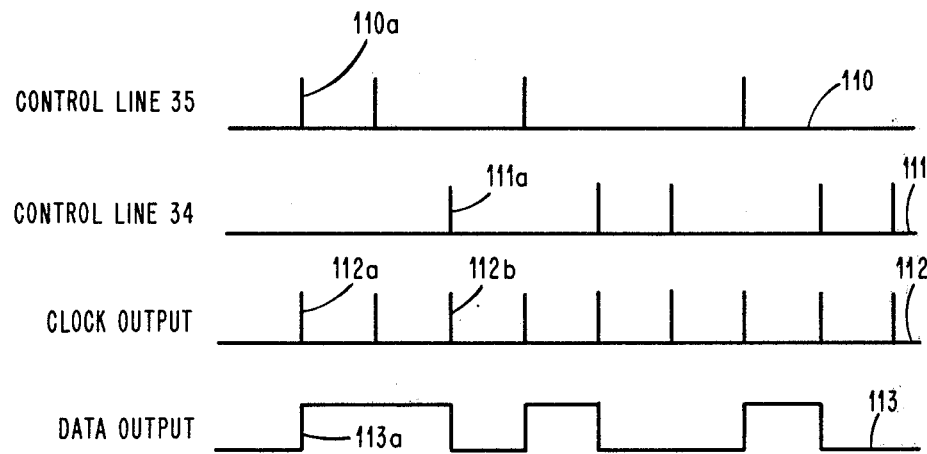

Referring to FIG. 7, the operation of the separator unit 70 is illustrated in graphic form. More particularly, logic one pulses on control lines 34 and 35 are supplied to the separator unit as illustrated by waveforms 110 and 111. The clock and data outputs of the separator unit are illustrated by waveforms 112 and 113, respectively. The time periods between the occurrence of pulses in waveform 112 is dependent upon the card insertion speed. The width of the pulses comprising the waveform 112, however, are independent of insertion speed. In the preferred embodiment disclosed herein, such pulse widths are of the order of 50.0 microseconds.

The leading edge of a data pulse 113a occurs in sync with the leading edge of clock pulse 112a of waveform 112, and in sync with the leading edge of a first-occurring logic one pulse 110a of waveform 110. The trailing edge of pulse 113a occurs in sync with the leading edge of a first-occurring logic zero pulse 111a of waveform 111, and in sync with the leading edge of a clock pulse 112b.

The leading edge of a first pulse of waveform 113 thus occurs in sync with the leading edge of a logic one pulse comprising waveform 110. The trailing edge of the waveform 113 pulse occurs in sync with the leading edge of the first logic zero pulse of waveform 111 following the logic one pulse of waveform 110. The leading edge of a next pulse of waveform 113 occurs in sync with the leading edge of the first logic one pulse of waveform 110 following the trailing edge of the preceding pulse of waveform 113.

The clock pulses of waveform 112 occur in sync with the logic one pulses of waveform 110 and waveform 111.

Figure 8:
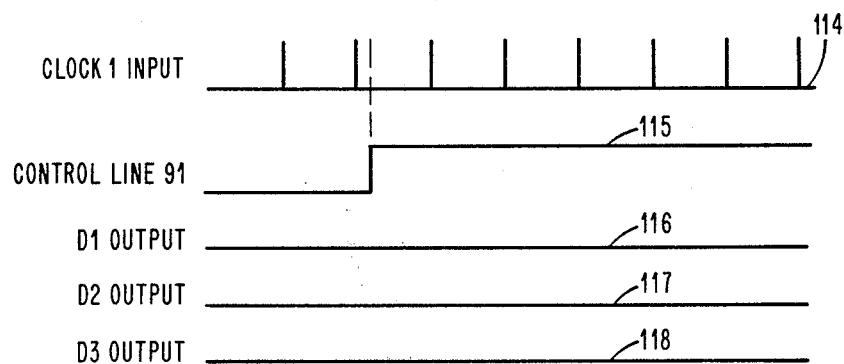

Referring to FIG. 8, a waveform 114 illustrates the clock pulses applied to the clock 1 input of the detector unit 75, and the waveform 115 illustrates the logic levels supplied to the control line 91 by optical switch 17. The waveforms 116-118 illustrate respectively the D1-D3 outputs of the detector unit 75.

When a customer badge is inserted correctly into the card reading mechanism, the D1-D3 outputs of the detector unit 75 shall remain at a logic zero level as illustrated by waveforms 116-118. A correct insertion further is indicated when the waveform 115 transitions to a logic one level after at least one clock pulse of waveform 114 is received by the wrongside detector unit 75.

Figures 9, 10:
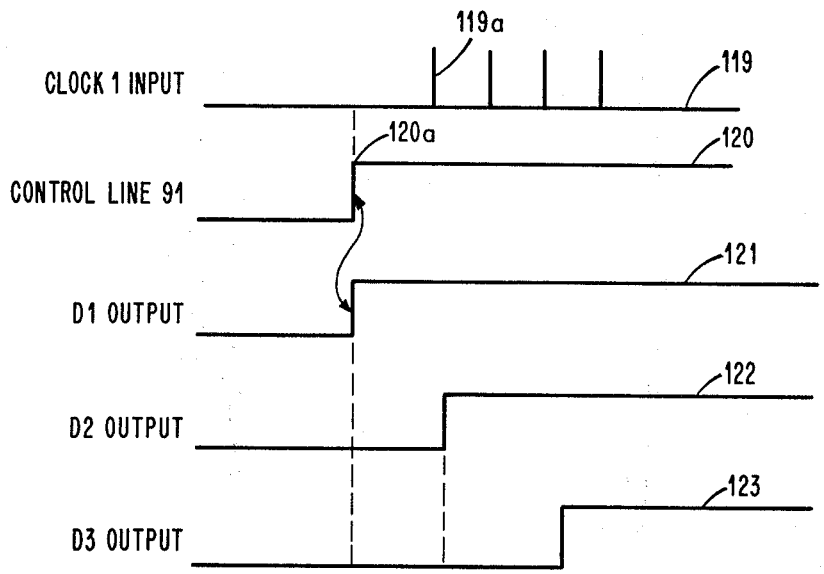

Referring to FIG. 9, waveforms 119-123 correspond on a one-to-one basis with waveforms 114-118 of FIG. 8, but illustrate an error condition arising from an incorrect insertion of a badge. When a badge is inserted incorrectly, a clock pulse 119a of waveform 119 occurs at the D2 output of separator unit 70 after the optical switch 17 causes the control line 91 to transition to a logic one level as illustrated by waveform 120. In recognition of the error condition, the D1-D3 outputs of the wrongside detector unit 75 transition to a logic one level in the sequence indicated by waveforms 121-123. More particularly, the D1 output of the detector unit 75 as illustrated by waveform 121 transitions to a logic one level concurrently with the leading edge 120a of waveform 120. Approximately one millisecond later, the D2 output of the detector unit transitions to a logic one level as illustrated by waveform 122. Approximately one millisecond thereafter, the D3 output of the detector unit 75 as illustrated by waveform 123 transitions to a logic one level.

An incorrect card insertion occurs when the card is positioned in any manner except the correct manner. In the preferred embodiment disclosed herein, the correct manner would be indicated by the occurrence of a bistable magnetic wire pattern in the right-hand corner of the card as illustrated at 12a of FIG. 1.

FIGS. 10-12 illustrate a logic truth table of the operation of the output modification logic unit 87. More particularly, the row 0, row 1 and row 2 outputs of decoder 86 are modified by the output modification logic unit 87 in accordance with the truth tables of FIGS. 10-12, respectively. Referring to the first entry in the truth table of FIG. 10, if the row 0 output of the decoder 86 is at a logic zero level, and the D1 and D3 outputs of the detector unit 75 are at a logic zero level, the row 0 output line of data cable 88 shall be at a logic one level. The logic truth tables of FIGS. 11 and 12 may be similarly construed to determine respectively the modifications to the row 1 and row 2 outputs of decoder 86. In the logic truth tables, the occurrence of an X indicates a "don't care" logic condition. It is thus seen from the truth tables of FIGS. 10-12 that the row 0, row 1 and row 2 outputs of the decoder 86 are modified by the logic unit 87 in the event that an error is detected by the detector unit 75. The row 3-10 outputs of the decoder 86, however, are not modified and are applied directly to the data cable 88.

Figure 13:
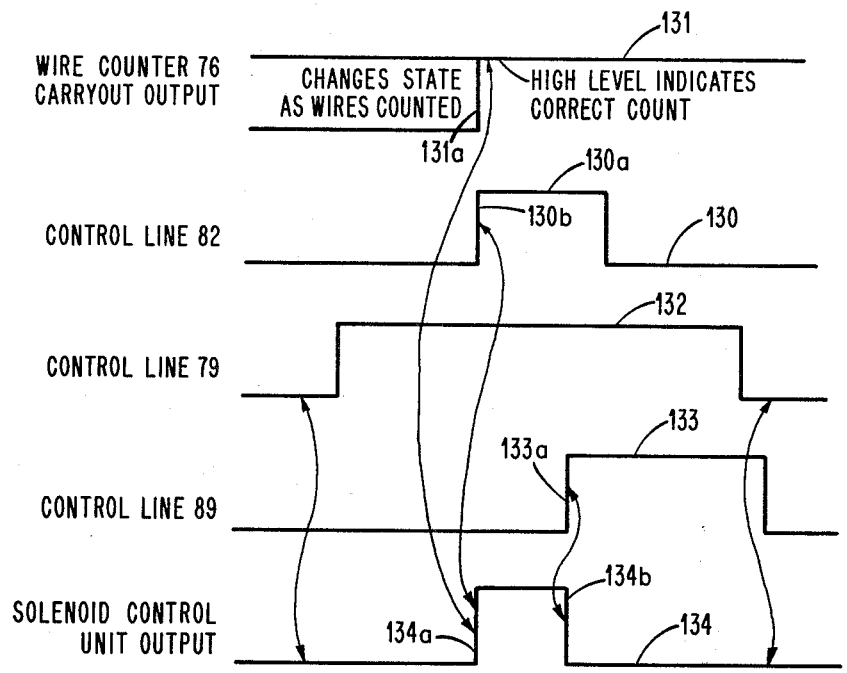
Figure 14:
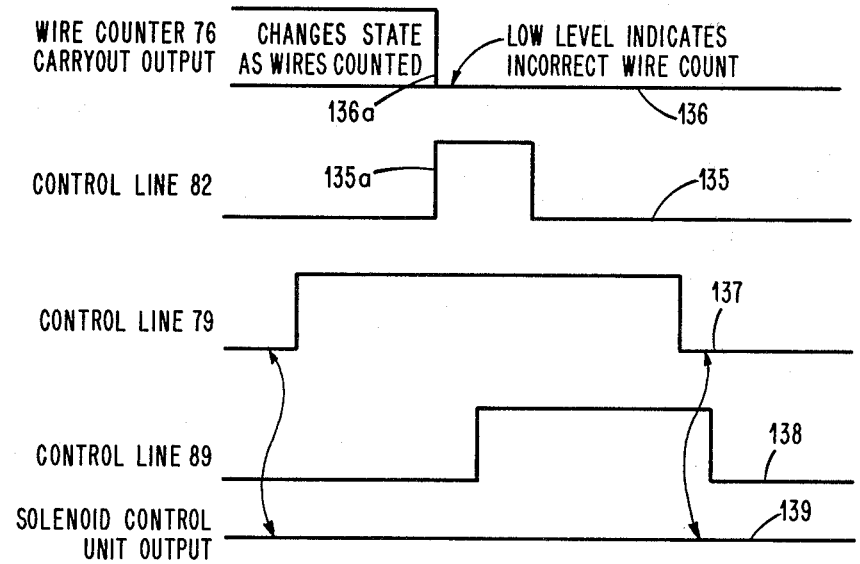

FIGS. 13 and 14 illustrate the operation of the solenoid control unit 80 of FIG. 6 under the condition that the counter 76 indicates a correct bistable magnetic wire count in a customer badge. A waveform 130 illustrates the logic level of the control line 82 leading to the I1 input of the solenoid control unit 80, a waveform 131 illustrates the logic level of the carry-out output of wire counter 76 as applied to the I3 input to the control unit, and a waveform 132 illustrates the logic level of the control line 79 leading to the reset input of the control unit. A waveform 133 illustrates the logic level of the control line 89 leading to the I2 input of the control unit 80, and a waveform 134 illustrates the D1 output of the control unit.

When a badge has been fully inserted into the badge reader as represented by pulse 130a of waveform 130, the output of the wire counter 76 remains at a logic one level as illustrated by waveform 131. If a predetermined correct count of bistable magnetic wires is indicated, the carry-out output of the counter 76 transitions to a logic one level as illustrated at 131a of waveform 131. The occurrence of a correct wire count at the time that the control line 82 of FIG. 6 transitions to a logic one level, as indicated at 130b of waveform 130, causes the output of the solenoid control unit 80 to transition to a logic one level as at 134a of waveform 134. When data has been read by the local controller of the badge reader, the control line 89 transitions to a logic one level at 133a of waveform 133. The output of the solenoid control unit 80 thereupon transitions to a logic zero level at 134b of waveform 134.

Referring to FIG. 14, the operation of the solenoid control unit 80 under the condition of an incorrect bistable magnetic wire count is illustrated. Waveforms 135-139 of FIG. 14 illustrate the logic levels of the same logic devices illustrated by waveforms 130-134, respectively. When an incorrect wire count is indicated by the wire counter 76 at the time that a badge has been fully inserted as indicated at 135a of waveform 135, the carry-out output of the wire counter 76 shall be at a logic zero level as indicated at 136a of waveform 136. The output of the solenoid control unit 80 thus remains at a logic zero level as illustrated by waveform 139.

Figure 15:
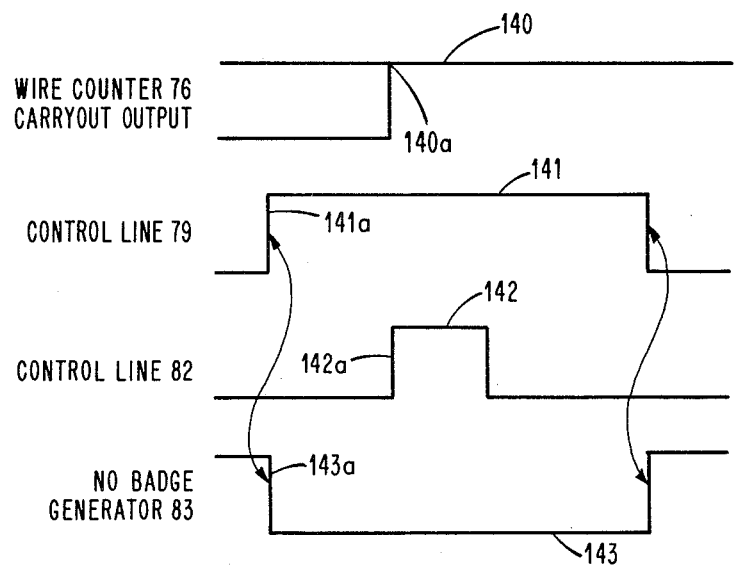
Figure 16:
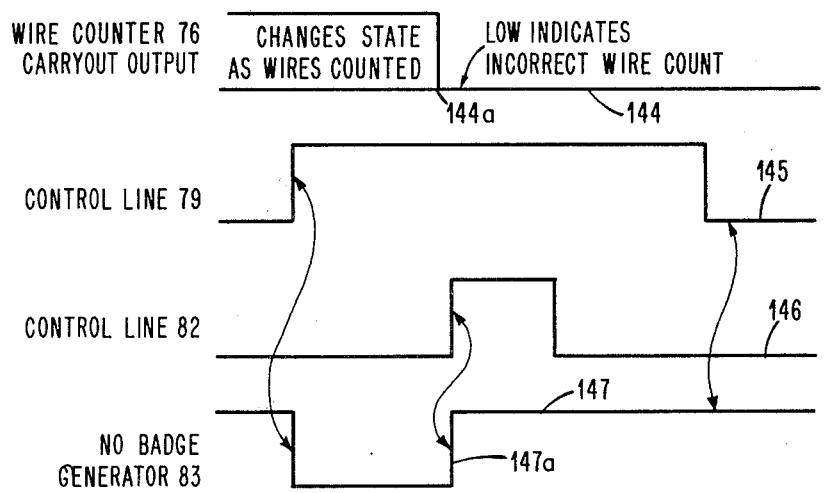

Referring to FIGS. 15 and 16, the operation of the no-badge generator 83 of FIG. 6 is illustrated. A waveform 140 illustrates the carry-out output of the counter 76 of FIG. 6 as applied to the I1 input of the generator 83. A waveform 141 illustrates the logic level of the control line 79 leading to the I2 input of the generator 83, and a waveform 142 illustrates the logic level of the control line 82 leading to the I3 input of the generator. A waveform 143 illustrates the output of generator 83 as applied to the control line 92.

After a badge has been inserted into the badge reader slot as indicated at 141a of waveform 141, the output of the no-badge generator 83 transitions to a logic zero level as indicated at 143a of waveform 143. When the badge has been fully inserted into the badge reader, the control line 82 transitions to a logic one level as indicated at 142a of waveform 142. If at that point in time the wire counter 76 indicates a count of a correct number of bistable magnetic wires, the carry-out output of the connector remains at a logic one level as illustrated at 140a of waveform 140. In this event, the output of the generator 83 remains at a logic zero level during the time period that the control line 79 is at a logic one level.

If a badge is partially inserted and then retrieved before full insertion, and waveform 141 transitions to a logic zero before the leading edge of pulse 142, then waveform 143 also shall go high before pulse 142a to indicate an error condition to the local controller.

If a badge were partially inserted and immediately thereafter retrieved from the badge reader before a full insertion had been accomplished, waveform 141 would transition to a logic zero before the leading edge 142a of pulse 142. In this event, the waveform 143 also would transition to a logic one level before pulse edge 142a to indicate an error condition to the local controller.

FIG. 16 illustrates the operation of the no-badge generator 83 under the condition of an incorrect bistable magnetic wire count by counter 76. The waveforms 144-147 illustrate the logic levels of the same logic devices as illustrated respectively by waveforms 140-143.

If the count indicated by the counter 76 is not equal to the predetermined correct count of bistable magnetic wires, the carry-out output of the counter 76 shall be at a logic zero level as indicated at 144a of waveform 144. The output of the generator 83 thereupon shall transition to a logic one level as indicated at 147a of the waveform 147.

Figure 17:
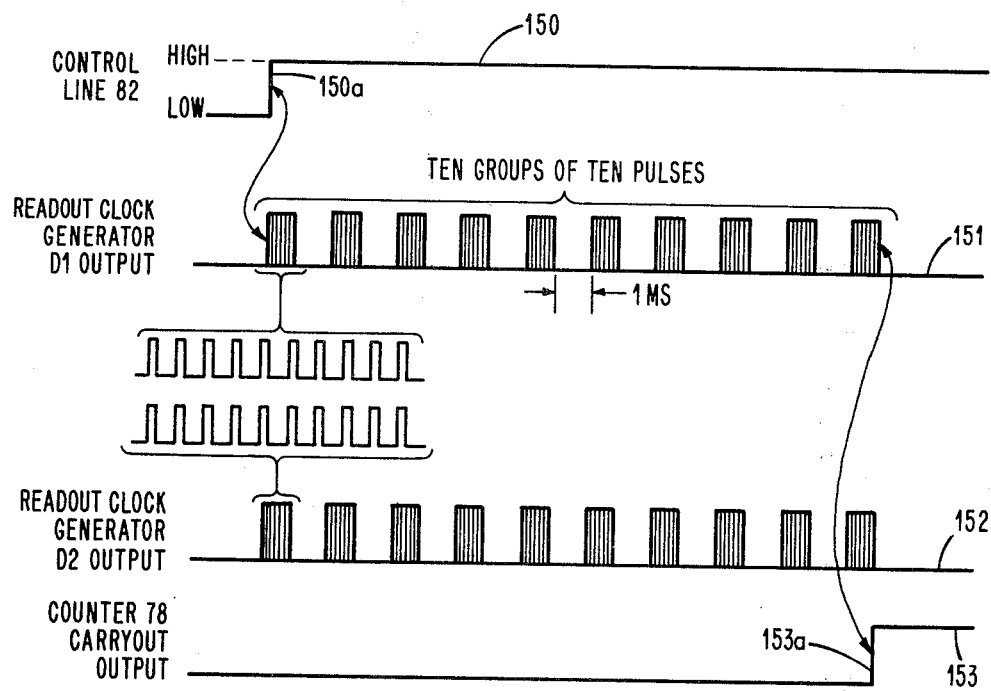

Referring to FIG. 17, the operation of the read-out clock generator 81 of FIG. 6 is illustrated. A waveform 150 illustrates the logic level of control line 82 leading to the start input of generator 81. A waveform 151 illustrates the D1 output of generator 81, and a waveform 152 illustrates the D2 output of generator 81. A waveform 153 illustrates the carry-out output of counter 78 leading to the stop input of generator 81.

When a customer badge has been fully inserted into the card reading system, the control line 82 transitions to a logic one level as indicated at 150a of waveform 150 to initialize the read-out clock generator 81. Ten 10-pulse bursts wherein successive bursts are separated by approximately one millisecond are provided at the D1 output of the clock generator as illustrated by waveform 151. In addition, ten 10-pulse bursts occur at the D2 output of the clock generator 81 as illustrated by the waveform 152. The clock bursts of the waveform 152, however, are slightly delayed from those of the waveform 151. More particularly, the first pulse comprising a clock burst of waveform 152 occurs at the trailing edge of a first pulse of a 10-pulse burst of waveform 151. When the carry-out output of the counter 78 transitions to a logic one level as indicated at 153a of waveform 153, the D1 and D2 clock signal outputs of the generator 81 cease.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A bistable magnetic wire badge reading system for detecting coded patterns of bistable magnetic wires embedded in a user badge and forwarding information read from said badge to a local controller, which comprises:

(a) sensor means for detecting the presence of said badge at spaced apart stations along an insertion path into said reading system and issuing logic signals to signal the occurrence of initial, intermediate and full badge insertions;

(b) bistable magnetic wire detection means positioned in registration with said insertion path for generating logic pulse trains representative of said coded patterns;

(c) logic control means responsive to said logic signals, and receiving said logic pulse trains for validating said user badge and formatting said logic pulse trains into an information stream for validation by said local controller; and (d) badge restraining means responsive to a valid badge signal received from said logic control means for gripping said badge upon the detection of a full badge insertion by said sensor means, and thereafter releasing said badge in the event said local controller signals to said logic control means the detection of valid data in said information stream.

2. A badge reading system in an information validation system including a local controller, which comprises:

(a) a badge having embedded therein bistable magnetic wires arranged in coded patterns;

(b) sensor means for detecting the presence of said badge at spaced apart stations along an insertion path into said badge reading system, and issuing logic signals to indicate the occurrence of initial, intermediate and full badge insertions;

(c) bistable magnetic wire detection means positioned in registration with said insertion path for generating information streams representative of said coded patterns;

(d) information formatting means in electrical communication with said bistable magnetic wire detection means for reforming said information streams into a format suitable for further processing by said local controller;

(e) wrongside detection means in electrical communication with said sensor means and said information formatting means for signalling to said local controller the occurrence of incorrect badge orientation in said insertion path;

(f) badge validation means in electrical communication with said formatting means and said sensor means for issuing a badge validation signal upon the occurrence of a correct number of bistable magnetic wires in said badge to said local controller; and (g) badge restraining means in electrical communication with said sensor means, said badge validation means and said local controller for gripping said badge in response to said badge validation signal and thereafter releasing said badge in response to a data validation signal received from said local controller.

3. A bistable magnetic wire badge reading system in an information validation system having a local controller, which comprises:

(a) a badge having embedded therein bistable magnetic wires arranged in binary coded decimal information patterns;

(b) a badge reader housing including a pair of badge guides for accepting said badge along a single insertion path into said housing;

(c) a first badge sensor positioned within said housing near the entrance of said insertion path for indicating the presence of said badge between said guide;

(d) badge reader means positioned within said housing in registration with said insertion path for generating logic pulse trains representative of said coded information patterns;

(e) logic control means responsive to a logic signal received from said first badge sensor upon detection of said badge for validating said badge and formatting said logic pulse trains into an information stream for validation by said local controller;

(f) a second badge sensor in electrical communication with said logic control means, and positioned inward from said first badge sensor along said insertion path within said housing, and separated from said badge reader means by a distance accommodating the detection by said badge reader means of at least one bistable magnetic wire before said badge is sensed by said second badge sensor to indicate to said logic control means the occurrence of a correct badge orientation and the forward progress of said badge past said first badge sensor into said housing;

(g) a third badge sensor in electrical communication with said logic control means and positioned within said housing along said insertion path, and separated from said second badge sensor by a distance accommodating the detection of a full insertion of said badge into said housing to signal to said logic control means the occurrence of a full badge insertion; and (h) badge restraining means responsive to a valid badge signal received from said logic control means for gripping said badge upon the detection of a full badge insertion by said third badge sensor, and responsive to an information valid signal received from said local controller to release said badge.

4. A bistable magnetic wire badge reading system for detecting coded patterns of bistable magnetic wires embedded in a user badge and forwarding information read from said badge to a local controller, which comprises:

(a) sensor means for issuing logic signals indicating the progress of said badge in moving along an insertion path into said reading system;

(b) bistable magnetic wire detection means positioned in registration with said insertion path for generating logic pulse trains representative of said coded patterns; and (c) logic badge control means responsive to said logic signals, and receiving said logic pulse trains for validating said user badge, and formatting said logic pulse trains into an information stream for validation by said local controller.

* * * * *